(12) United States Patent
Sluijs

(10) Patent No.: US 7,298,116 B2
(45) Date of Patent: Nov. 20, 2007

(54) MULTIPLE-OUTPUT DC-DC CONVERTER

(75) Inventor: Ferdinand Jacob Sluijs, Nijmegen (NL)

(73) Assignee: NXP B.V., Eindhoven (NL)

( * ) Notice: Subject to any disclaimer, the term of this patent is extended or adjusted under 35 U.S.C. 154(b) by 238 days.

(21) Appl. No.: 10/537,137

(22) PCT Filed: Nov. 6, 2003

(86) PCT No.: PCT/IB03/05074

§ 371 (c)(1),
(2), (4) Date: Jun. 2, 2005

(87) PCT Pub. No.: WO2004/051831

PCT Pub. Date: Jun. 17, 2004

(65) Prior Publication Data

US 2006/0072252 A1    Apr. 6, 2006

(30) Foreign Application Priority Data

Dec. 5, 2002   (EP)   .................................... 02080114

(51) Int. Cl.
*G05F 1/10*  (2006.01)
(52) U.S. Cl. ..................... 323/222; 323/267
(58) Field of Classification Search ........ 323/282–286, 323/267, 269, 271, 272, 222, 225
See application file for complete search history.

(56) References Cited

U.S. PATENT DOCUMENTS 5,617,015 A * 4/1997 Goder et al. ................. 323/282

FOREIGN PATENT DOCUMENTS

| WO | WO 02/058220 | 7/2002 |
| WO | WO 2005/058220 | 7/2002 |

\* cited by examiner

*Primary Examiner*—Rajnikant B. Patel

(57) ABSTRACT

The multiple-output DC-DC converter comprises an inductor (L) and a main switch (S0) which periodically couples a DC-input voltage (Vin) to the inductor (L). Each one of a multitude of loads (L1, L2, L3) is coupled to the inductor (L) via one of a multitude of output switches (S1, S2, S3). One of a multitude of output voltages (V1, V2, V3) is present across each of the loads (L1, L2, L3). A controller (CO) controls the main switch (S0) and the output switches (S1, S2, S3) in sequences (SE) of cycles (CY). Each one of the cycles (CY1, CY2, CY3) contains an on-phase of the main switch (S0) followed by an on-phase of one of the multitude of output switches (S1, S2, S3). The cycles (CY1, CY2, CY3) have either a predetermined first (minimum) duty cycle (D1) or a second (maximum) duty cycle (D2) which is larger than the first duty cycle (D1). The controller (CO) comprises a multitude of comparators (10, 11, 12) which each compare one of the multitude of output voltages (V1, V2, V3) with an associated one of a multitude of reference voltages (VR1, VR2, VR3). The controller (CO) further checks whether the number of the multitude of output voltages (V1, V2, V3) which have a value above their associated reference voltage (VR1, VR2, VR3) is larger than, smaller than, or equal to the number of the multitude of output voltages (V1, V2, V3) which have a value below their associated reference voltage (VR1, VR2, VR3). The duty cycles are selected such that the number of cycles (CY1, CY2, CY3) with the minimal duty cycle (D1) are larger than, smaller than, or equal to the number of cycles with the maximum duty cycle (D2), respectively.

16 Claims, 5 Drawing Sheets

Figure 3:
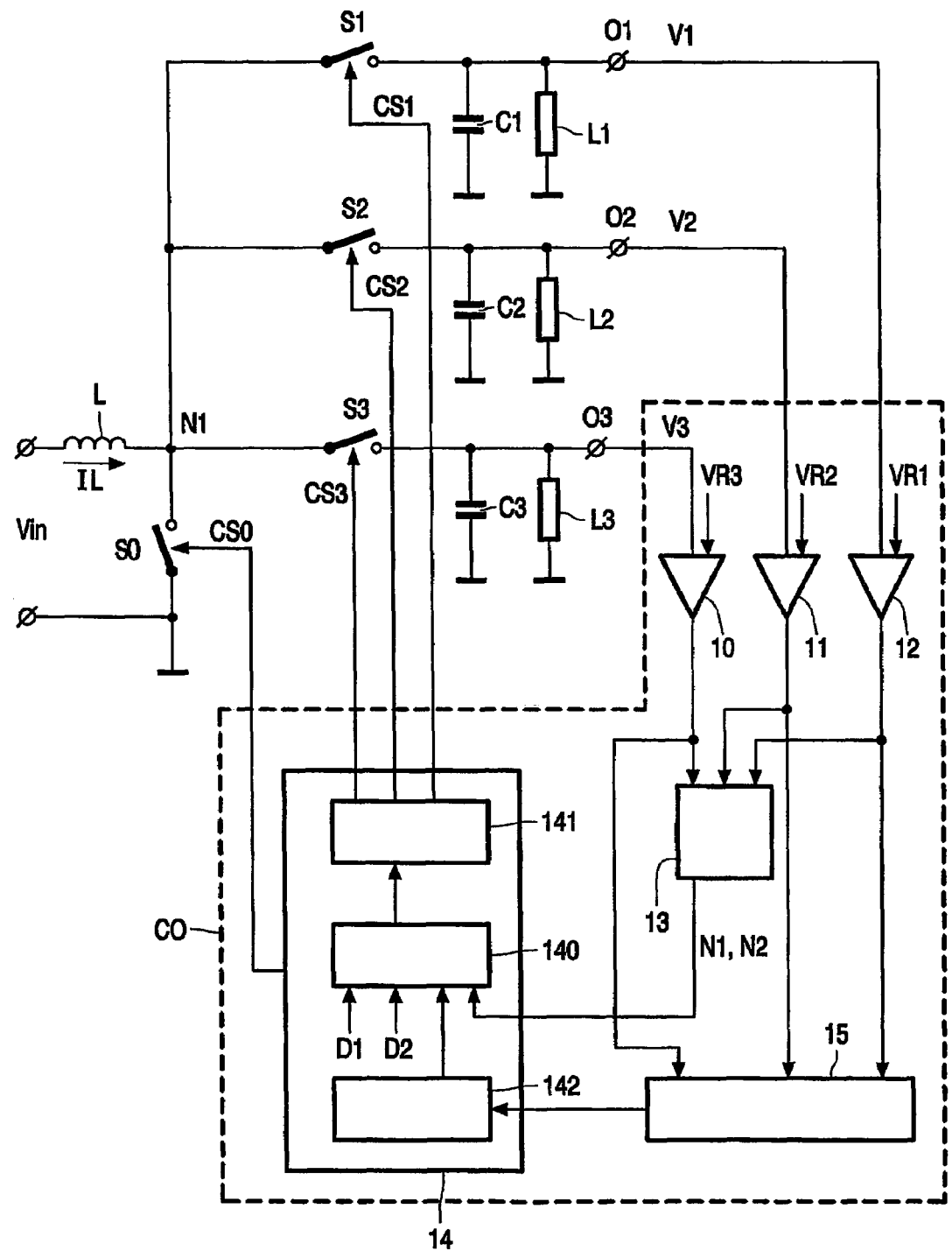

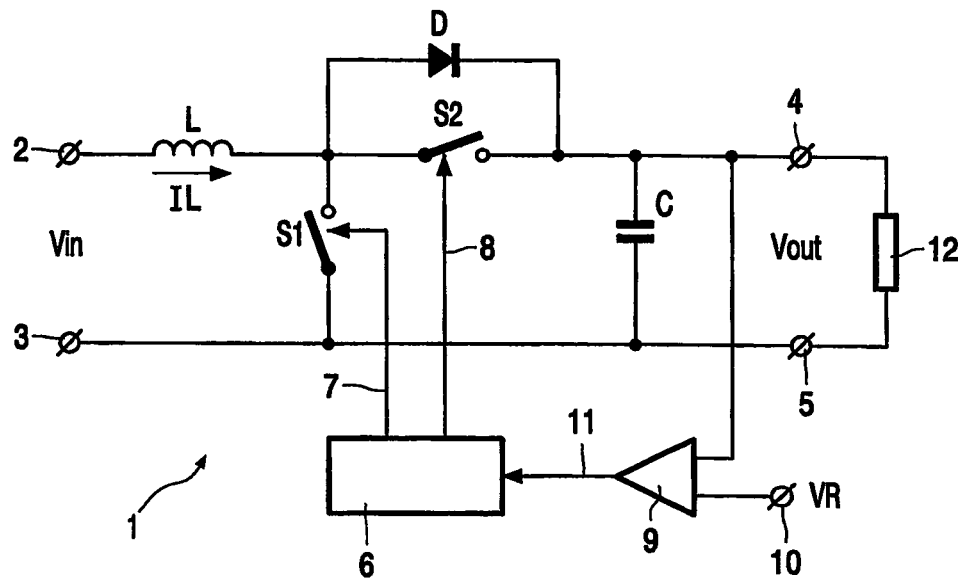
FIG. 1
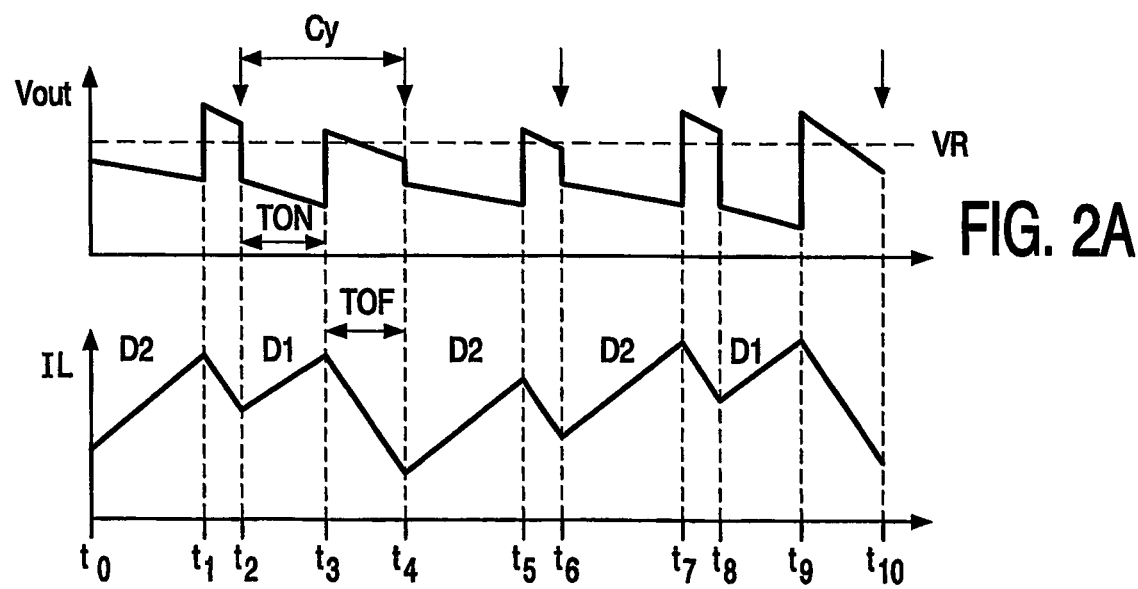
FIG. 2A
FIG. 2B

MULTIPLE-OUTPUT DC-DC CONVERTER

The invention relates to a multiple-output DC-DC converter, an electronic apparatus comprising such a multiple-output DC-DC converter, and a method of controlling a multiple-output DC-DC converter.

WO 02/058220-A1 discloses a single output DC-DC converter in which a main switch periodically couples a DC input voltage to an inductor to store energy in the inductor during an on-period of the main switch. During an off-period of the main switch, a secondary switch couples a load to the inductor to transfer energy from the inductor to the load. A subsequent on and off-period of the main switch is called a switching cycle or a cycle. A ratio of the on-period to the duration of a cycle is called the duty cycle.

The output voltage of the DC-DC converter is regulated by comparing the output voltage across the load with a reference level. If the output voltage is above the reference level, this indicates that the amount of energy supplied to the load is too high. During the next cycle, the duty cycle will have a predetermined minimum value so that the amount of energy stored in the inductor will be minimal. If the output voltage is below the reference level, during the next cycle, the duty cycle will have a predetermined maximum value. The output voltage is thus regulated by using the minimum and the maximum duty cycle only.

This prior art DC-DC converter is unsuitable for providing multiple individually regulated output voltages.

It is an object of the invention to provide a multiple-output DC-DC converter in which the multiple output voltages are each regulated.

A first aspect of the invention provides a multiple-output DC-DC converter as claimed in claim 1. A second aspect of the invention provides an electronic apparatus comprising such a multiple-output DC-DC converter as claimed in claim 16. A third aspect of the invention provides a method of controlling a multiple-output DC-DC converter as claimed in claim 17. Advantageous embodiments are defined in the dependent claims.

The multiple-output DC-DC converter in accordance with the invention comprises an inductor and a main switch which periodically couples a DC-input voltage to the inductor. During the on-time of the main switch, energy is stored in the inductor. Each one of a multitude of loads is coupled via one of a multitude of output switches to the inductor. Across each of the loads, one of a multitude of output voltages is present.

A controller controls the main switch and the output switches in sequences of cycles. Each one of the cycles contains an on-phase of the main switch followed by an on-phase of one of the multitude of output switches. The cycles have either a predetermined first or a second duty cycle which is larger than the first duty cycle. No other duty cycles occur. The first duty cycle is also referred to as the minimum duty cycle, and the second duty cycle is also referred to as the maximum duty cycle.

The controller comprises a multitude of comparators which each compare one of the multitude of output voltages with an associated one of a multitude of reference voltages. The controller further checks whether the number of the multitude of output voltages which have a value above their associated reference voltage, is larger than, smaller than, or equal to the number of the multitude of output voltages which have a value below their associated reference voltage. Depending on the outcome of the check made by the controller, the duty cycles are selected such that the number of cycles with the minimal duty cycle (this number of duty cycles is further referred to as the first number) are larger than, smaller than, or equal to the number of cycles with the maximum duty cycle (this number of duty cycles is further referred to as the second number), respectively.

In this manner, the total energy stored in the inductor will track the total energy required by the loads. For example, if in a DC-DC converter with three outputs, one of the output voltages is above its associated reference voltage (also referred to as reference level, or reference value), and two of the output voltages are below their associated reference level, the energy to be supplied to the first mentioned output should decrease while the energy supplied to the last mentioned output should be increased. Consequently, the total energy stored in the inductor should increase and the number of outputs which require more energy is larger than the number of outputs which require less energy. Thus, in the next sequence of cycles, the number of cycles with the maximum duty cycle should be larger than the number of cycles with the minimum duty cycle.

WO 02/058220-A1 discloses a multiple-output DC-DC converter in which the outputs are independently controlled in either the pulse width modulation (further referred to as PWM mode or the pulse frequency modulation (further referred to as PFM) mode. In the PWM mode, the duty cycles of the outputs differ because for each output the ratio between the input voltage and the output voltage is different. Moreover, the duty cycle is also related the current in the coil of the converter and the total output power provided. Further, the output has to be determined that requires the highest amount of energy. This output has to operate in the PWM mode. Then, the number of switching cycles of any other output operating in the PWM mode is determined from which part of the total amount of energy has to be supplied to a particular output. This prior art DC-DC converter is complex because it has to be determined which output requires the highest amount of energy to control its duty cycle such that sufficient energy will be stored in the inductor, what the duty cycle of the other outputs should be, and how many switching cycles have to be applied for a particular output in the total switching sequence.

The DC-DC converter in accordance with the invention only has to select how many of the two predetermined duty cycles (the minimum and the maximum duty cycle) have to be provided in the total switching sequence.

In an embodiment as defined in claim 2, the number of cycles in a sequence to which the minimum duty cycle is allocated, equals the number of output voltages which have a value above their associated reference voltage. The number of output voltages which have a value equal to their associated reference voltage, are either neglected, or are arbitrarily assigned to the cycles with the minimum or maximum duty cycle. The number of cycles in the sequence to which the maximum duty cycle is allocated equals the number of output voltages that have a value below their associated reference voltage.

In an embodiment as defined in claim 3, as much as possible with the present values of the first number and the second number, one of the cycles with the maximum duty cycle precedes one of the cycles with the minimum duty cycle. In this manner, first, during the cycles with the maximum duty cycle, the average current through the inductor increases, and then, during the cycles with the minimum duty cycle, the average current through the inductor decreases. Consequently, the chance that the current through the inductor becomes zero is minimized.

In an embodiment as defined in claim 4, the order of the cycles in a sequence is selected to first comprise all the cycles with the maximum duty cycle and then all the cycles with the minimum duty cycle. Due to the cycles with the maximum duty cycle, first the average value of the current through the inductor increases, then, due the cycles with the minimum duty cycle, the average value decreases. Again, the chance that the current through the inductor becomes zero is minimized.

In an embodiment as defined in claim 5, the minimum duty cycles are allocated as much as possible to cycles of which the corresponding output voltages have a value below their associated reference voltage. In cycles with the minimum duty cycle, the duration of the on-time of the output switch is larger than in the cycles with the second duty cycle and thus the amount of energy supplied to the associated load is larger. This is exactly what is required at an output with an output voltage below its reference value. Similarly, the maximum duty cycles are allocated as much as possible to cycles of which the corresponding output voltages have a value above their associated reference voltage.

Both the number of the minimum and the maximum duty cycles in a sequence are determined by the number of output voltages above and below their associated reference voltages, respectively. Whereas in contrast, the minimum duty cycles are preferably allocated to output switches corresponding to outputs that have an output voltage below their reference value and the maximum duty cycles are preferably allocated to output switches corresponding to outputs that have an output voltage above their reference value. Usually, there will be no match in the numbers concerned, and, consequently, a maximum duty cycle will be allocated to some of the output voltages with a value below their reference value as defined in claim 7, or a minimum duty cycle will be allocated to some of the output voltages above their reference value, as is defined in claim 6.

In an embodiment as defined in claim 8, in a sequence of cycles, the cycle wherein a lowest amount of energy is transferred is allocated to an output of which the output voltage is above its associated reference voltage. This causes a minimal further increase of this voltage which already has a value higher than its reference value.

In an embodiment as defined in claim 9, the first cycle in a sequence is allocated to an output of which the voltage is above its associated reference voltage and to which a minimum duty cycle is allocated. Usually, the first cycle in a sequence starts with the lowest average value of the current in the inductor. This is due to the fact that cycles with the minimum duty cycle occur at the end of the sequence. This lowest amount of energy should be supplied to an output that is going to receive a much larger amount of energy than required. This is particularly true for an output that has already a voltage above its reference value and to which a minimum duty cycle has to be allocated because there are no maximum duty cycles left.

In an embodiment as defined in claim 10, in a sequence of cycles, the cycle wherein a highest amount of energy is transferred is allocated to an output of which the voltage is below its associated reference voltage. This causes a minimal further decrease of this voltage which already has a value lower than its reference value.

In an embodiment as defined in claim 11, in a sequence, the last cycle to which a maximum duty cycle is allocated is selected to be an output of which the voltage is below its associated reference voltage and to which a maximum duty cycle is allocated. Usually, in a sequence, the last cycle to which a maximum duty cycle is allocated has the highest average value of the current in the inductor. This is due to the fact that cycles with the minimum duty cycle occur at the end of the sequence. This highest amount of energy should be supplied to an output which is going to receive a much smaller amount of energy than required. This is particularly true for an output that already has a voltage below its reference value and to which a maximum duty cycle has to be allocated because there are no minimum duty cycles left.

In an embodiment as defined in claim 12 or 13, if in a particular sequence either the minimum or the maximum duty cycle has to be allocated to an output of which the voltage is above or below its reference level, respectively, in a next sequence the correct duty cycle is allocated to this output. This has the advantage, that the wrong allocating of duty cycles will be averaged over time and thus its negative influence on the regulation of the output voltages concerned is minimized.

In an embodiment as defined in claim 14, the mode of the outputs is tracked.

In an embodiment as defined in claim 15, if the mode indicates that an output does not need to supply current to the load, no switching cycle should be allocated to this output to prevent the output voltage to rise even further.

These and other aspects of the invention are apparent from and will be elucidated with reference to the embodiments described hereinafter.

IN THE DRAWINGS

Figure 4:
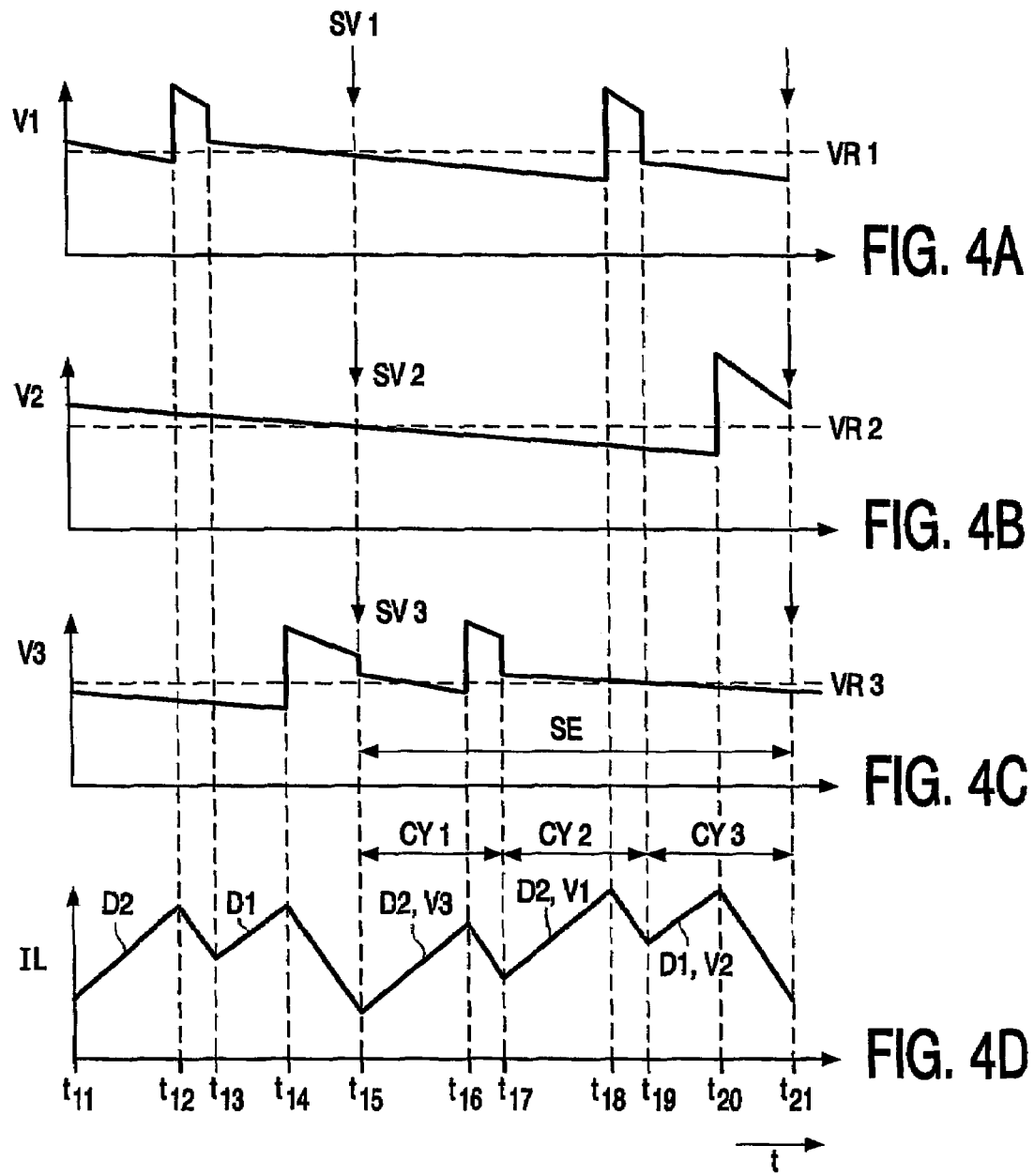
Figure 5:
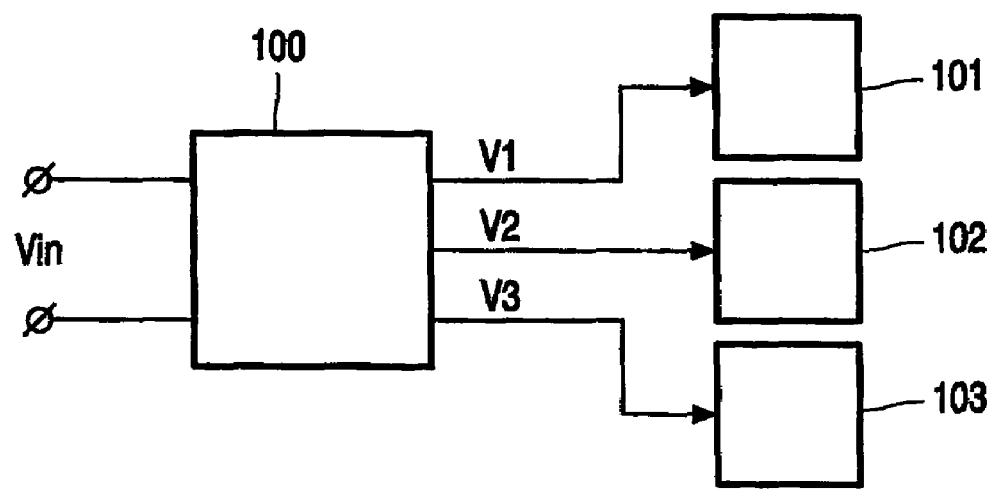
Figure 6:
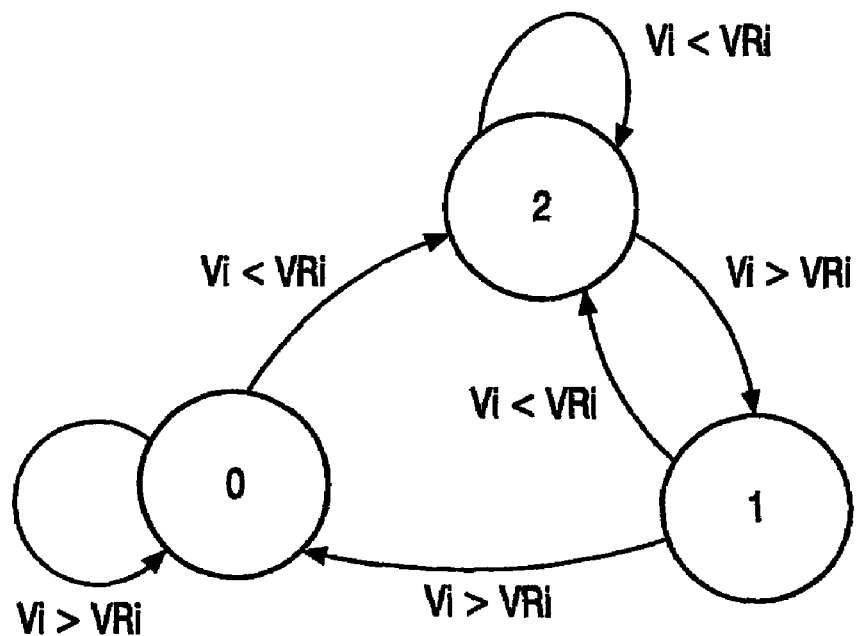
Figure 7:
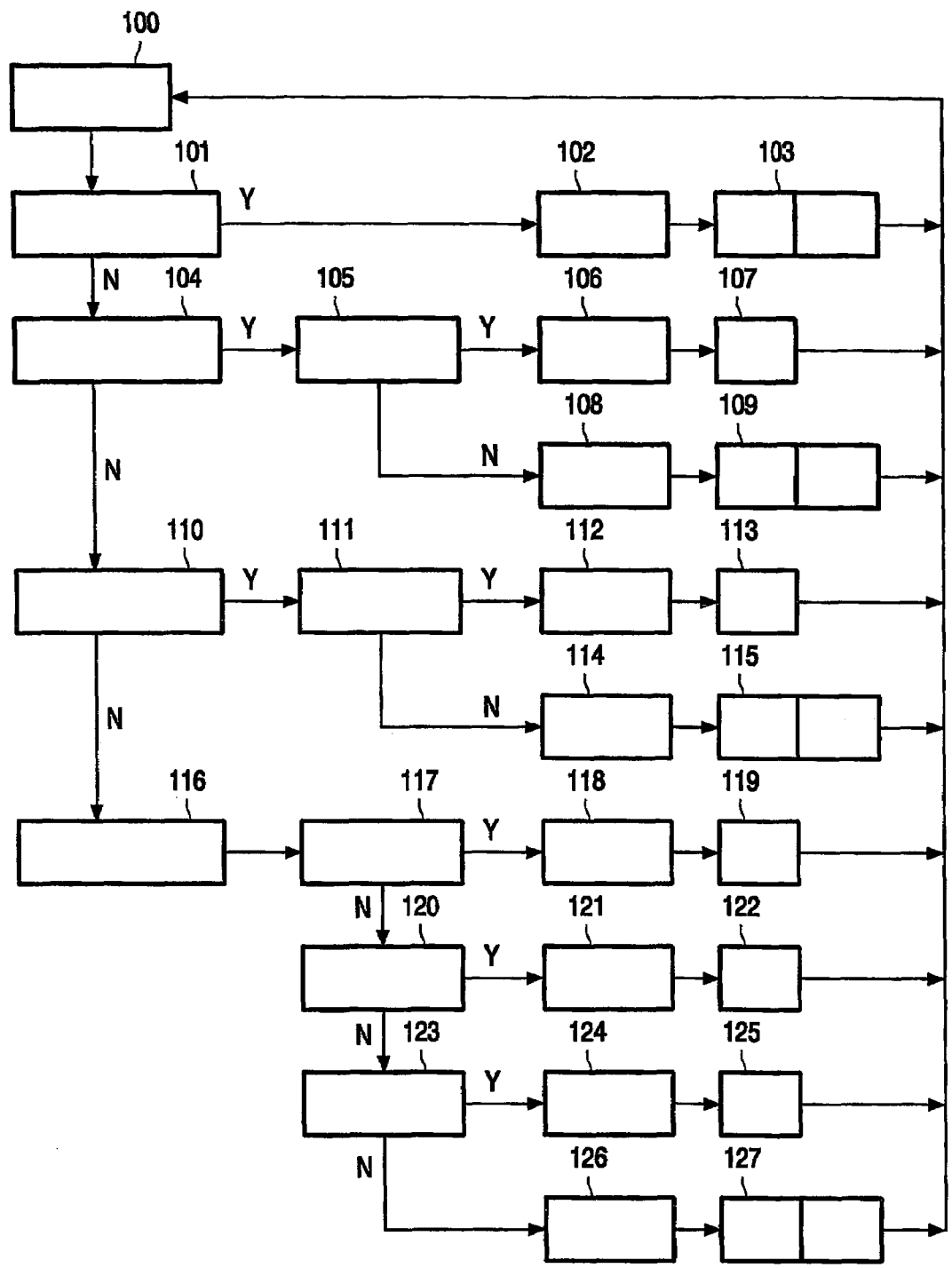

FIG. 1 shows a circuit diagram of a prior art single output DC-DC converter with a dual duty cycle control, FIG. 2 show signals occurring in the prior art DC-DC converter of FIG. 1, FIG. 3 shows a circuit diagram of a multiple output DC-DC converter in accordance with an embodiment of the invention, FIG. 4 show signals for elucidating the DC-DC converter of FIG. 3, FIG. 5 shows a block diagram of an apparatus with a DC-DC converter in accordance with the invention, FIG. 6 shows a state diagram for elucidating the modes of output voltages, and FIG. 7 shows a flow chart of a control algorithm in a DC-DC converter in accordance with the invention.

Like references in the various Figures refer to like signals or to like elements performing like function 1.

FIG. 1 shows a circuit diagram of a prior-art single output DC-DC converter with a dual duty cycle control. The DC-DC converter, which in FIG. 1 is an up-converter 1 comprises a series arrangement of an inductor L and a first switch S1 (the main switch) arranged between a first input terminal 2 and a second input terminal 3 to receive an input voltage Vin. A parallel arrangement of a diode D and a second switch S2 (the output switch) is arranged between the junction of the main switch S1 and the inductor L and the first output terminal 4. The second input terminal 3 and the second output terminal 5 are interconnected. A smoothing capacitor C is arranged between the first output terminal 4 and the second output terminal 5. A load 12 is connected between the first output terminal 4 and the second output terminal 5. A comparator 9 compares the output voltage Vout at the first output terminal 4 with a reference voltage VR at terminal 10 to supply an error signal 11 to the controller 6. The controller 6 supplies the control signals 7 and 8 to control the on and off periods of the main switch S1 and the output switch S2. The current through the inductor L is indicated by IL. The operation of the prior-art DC-DC converter will be elucidated with respect to FIG. 2.

FIG. 2 show signals occurring in the prior-art DC-DC converter of FIG. 1. FIG. 2A shows the output voltage Vout and the reference voltage VR, and FIG. 2B shows the current IL through the inductor L.

FIG. 2 show that each cycle CY has two phases. During the first phases which start at the instants t0, t2, t4, t6, t8, the main switch S1 is closed during the on-time TON while the output switch S2 is open. During the second phases which start at the instants t1, t3, t5, t7, t9, respectively, the main switch S1 is opened during the off-time TOF and the output switch S2, is closed. During the on-time TON of the main switch S1, the current IL in the inductor L increases and energy is stored in the inductor L. During the on-time of the output switch S2, the current IL in the inductor L decreases and energy is supplied to the load 12.

The duty cycle of a cycle CY is defined as the ratio of its on-time TON to the duration of the cycle CY. The DC-DC converter is regulated by selecting the duty cycle out of a first and a second duty cycle, the first duty cycle D1 is smaller than the second duty cycle D2. The first duty cycle D1 is also referred to as the minimum duty cycle, and the second duty cycle D2 is further referred to as the maximum duty cycle.

The arrows at the instants t2, t4, t6, t8, t10 indicate sample instants at which the comparator 9 compares the output voltage Vout with the reference voltage VR. If the output voltage Vout is higher than the reference voltage VR, a succeeding cycle CY will have the minimum duty cycle D1. If the output voltage Vout is lower than the reference voltage VR, a succeeding cycle will have the maximum duty cycle D2.

It is assumed that the value of the capacitor C is sufficiently large to keep the average level of the output voltage Vout substantially constant. At the instant t2, the main switch S1 is closed and the output switch S2 is opened, and consequently, the load 12 will draw a discharge current through the capacitor C which causes a downward jump in the voltage at the output due to the ESR. The ESR is the series impedance of the capacitor C. The linear decrease of the output voltage Vout from the instant t2 to t3 is due to the load discharging the output capacitor. At the instant t3, the main switch S1 is opened and the output switch S2 is closed: a charge current will flow into the capacitor C. Due to the ESR of the capacitor C, the polarity change of the current will cause an upward jump in the output voltage Vout. The decrease of the output voltage Vout from the instant t3 to t4 is due to the coil current decrease, resulting in an ESR voltage drop decrease. The comparator 9 compares the output voltage Vout with the reference level VR at, or just before the instant t4. In the example of FIG. 2, the level of the output voltage Vout is below the reference level VR, and thus a maximum duty cycle D2 will be allocated to the next cycle starting at the instant t4.

FIG. 3 shows a circuit diagram of a multiple-output DC-DC converter in accordance with an embodiment of the invention.

A series arrangement of an inductor L and a main switch S0 is arranged to receive an input DC-voltage Vin. This input DC-voltage may originate from a battery, or may be a rectified mains voltage. The junction of the inductor L and the main switch S0 is denoted by N1. The side of the main switch S0, which is not coupled to the node N1, is grounded. A first output switch S1 is arranged between the node N1 and a node O1. A second output switch S2 is arranged between the node N1 and a node O2. A third output switch S3 is arranged between the node N1 and a node O3. A parallel arrangement of a first capacitor C1 and a first load L1 is coupled between the node O1 and ground. A parallel arrangement of a second capacitor C2 and a second load L2 is coupled between the node O2 and ground. A parallel arrangement of a third capacitor C3 and a third load L3 is coupled between the node O3 and ground. A first output voltage V1 is present between the first node O1 and ground. A second output voltage V2 is present between the second node O2 and ground. A third output voltage V3 is present between the third node O3 and ground.

A first comparator 12 compares the first output voltage V1 with a first reference voltage VR1 to supply a first output signal. A second comparator 11 compares the second output voltage V2 with a second reference voltage VR2 to supply a second output signal. A third comparator 10 compares the third output voltage V3 with a third reference voltage VR3 to supply a third output signal.

Based on the first, second and third output signals, a logic circuit 13 determines whether a number of the output voltages V1, V2, V3 which have a value above their associated reference voltage VR1, VR2, VR3, is larger than, smaller than, or equal to a number of the multitude of output voltages V1, V2, V3 which have a value below their associated reference voltage VR1, VR2, VR3. The cycle generator 14 will generate, in a sequence SE of cycles CY1, CY2, CY3 (see FIG. 4), a first number N1 of cycles to which the minimum duty cycle D1 is allocated and a second number N2 of cycles to which the maximum duty cycle D2 is allocated corresponding to the number of the output voltages V1, V2, V3 which have a value above their associated reference voltage VR1, VR2, VR3, larger than, smaller than, or equal to a number of the multitude of output voltages V1, V2, V3 which have a value below their associated reference voltage VR1, VR2, VR3. Thus, if the number of the output voltages V1, V2, V3 which have a value above their associated reference voltage VR1, VR2, VR3, is larger than a number of the multitude of output voltages V1, V2, V3 which have a value below their associated reference voltage VR1, VR2, VR3, the first number N1 will be larger than the second number N2.

The controller CO comprises the comparators 10, 11 and 12, the logic circuit 13, and the cycle generator 14.

In another embodiment in accordance with the invention, as is shown in FIG. 3, the logic circuit 13 determines the number N1 of output voltages V1, V2, V3 which have a value above their associated reference voltage VR1, VR2, VR3 and the number N2 of output voltages V1, V2, V3 which have a value below their associated reference voltage VR1, VR2, VR3.

Now, the cycle generator 14 receives the numbers N1 and N2 and supplies the switching signals CS0, CS1, CS2, and CS3 to the main switch S0, the first output switch S1, the second output switch S2, and the third output switch S3, respectively. The cycle generator 14 generates the cycles CY1, CY2, CY3 (see FIG. 4) either with the minimum duty cycle D1 or the maximum duty cycle D2 which is larger than the minimum duty cycle D1 to obtain a first number N1 of cycles CY1, CY2, CY3 with the minimum duty cycle D1 and a second number N2 of cycles CY1, CY2, CY3 with the maximum duty cycle D2.

In a further embodiment in accordance with the invention, the cycle generator 14 comprises a sequencer 140 which controls an order of the cycles CY1, CY2, CY3 in a sequence SE such that, as much as possible at the present values of the first number N1 and the second number N2, one of the cycles CY1, CY2, CY3 with the maximum duty cycle D2 precedes one of the cycles CY1, CY2, CY3 with the minimum duty cycle D1. In this manner, first, during one of the cycles with the maximum duty cycle D2, the average value of the current IL through the inductor L increases, and then, during the successive cycle with the minimum duty cycle D1, the average value of the current IL through the inductor L decreases. Consequently, the chance that the current IL through the inductor L becomes zero is minimized.

Alternatively, the sequencer 140 may control the order of the cycles CY1, CY2, CY3 in a sequence SE to first comprise all the cycles CY1, CY2, CY3 with the maximum duty cycle D2 and then all the cycles CY1, CY2, CY3 with the minimum duty cycle D1. Again, the chance that the current IL through the inductor L becomes zero is The cycle generator 14 may further comprise an allocator 141 which allocates the first number N1 of the minimum duty cycles D1 as much as possible to cycles CY1, CY2, CY3 associated with output voltages V1, V2, V3 which have a value below their associated reference voltage VR1, VR2, VR3, and the second number N2 of the maximum duty cycles D2 as much as possible to cycles CY1, CY2, CY3 associated with output voltages V1, V2, V3 which have a value above their associated reference voltage VR1, VR2, VR3. In cycles CY1, CY2, CY3 with the minimum duty cycle D1, the duration of the on-time TON of the output switch (one of the first, second, or third switches S1, S2, S3) is larger than in the cycles with the maximum duty cycle D2 and is thus a larger amount of energy supplied to the associated load L1, L2, L3. This is exactly what is required at an output O1, O2, O3 with an output voltage V1, V2, V3 below its reference value VR1, VR2, VR3. In the same manner, the maximum duty cycles D2 are allocated as much as possible to cycles CY1, CY2, CY3 of which the associated output voltages V1, V2, V3 have a value above their corresponding reference voltage VR1, VR2, VR3.

In another embodiment in accordance with the invention, the allocater (141) further allocates the minimum duty cycle D1 to cycles CY1, CY2, CY3 associated with output voltages V1, V2, V3 which have a value above their associated reference voltage VR1, VR2, VR3 if the first number N1 is larger than the number of output voltages V1, V2, V3 which have a value below their associated reference voltage VR1, VR2, VR3. Or the other way around, the maximum duty cycle D2 is further allocated to cycles CY1, CY2, CY3 associated with output voltages V1, V2, V3 which have a value below their associated reference voltage VR1, VR2, VR3 if the second number N2 is larger than the number of output voltages V1, V2, V3 which have a value above their associated reference voltage VR1, VR2, VR3.

In yet another embodiment in accordance with the invention, the allocator 141 allocates a predetermined one of the cycles CY1, CY2, CY3 in a sequence SE wherein a lowest amount of energy is transferred to one of the output voltages V1, V2, V3 of which the value is above the associated reference voltage VR1, VR2, VR3. This causes a minimal further increase of an output voltage V1, V2, V3 which has a value already higher than its reference value VR1, VR2, VR3. In the same manner, the allocator 141 may allocate a predetermined one of the cycles CY1, CY2, CY3 in a sequence SE wherein a highest amount of energy is transferred to one of the output voltages V1, V2, V3 of which the value is below the associated reference voltage VR1, VR2, VR3.

The allocator 141 may allocate as the first cycle CY1 in a sequence SE an output voltage V1, V2, V3 of which the value is above the associated reference voltage VR1, VR2, VR3 and to which a minimum duty cycle D1 is allocated. Usually, the first cycle CY1 in a sequence starts with the lowest average value of the current IL in the inductor L. This is due to the fact that cycles CY1, CY2, CY3 with the minimum duty cycle D1 occur at the end of the sequence SE. This lowest amount of energy should be supplied to an output O1, O2, O3 which is going to receive a much larger amount of energy than required. This is particularly true for an output O1, O2, O3 that already has a voltage V1, V2, V3 above its reference value VR1, VR2, VR3 and to which a minimum duty cycle D1 has to be allocated because there are no maximum duty cycles D2 left.

The allocator 141 may allocate, in a sequence SE, a last cycle CY1 to which a maximum duty cycle D2 is allocated to an output voltage V1, V2, V3 of which the value is below the associated reference voltage VR1, VR2, VR3 and to which a maximum duty cycle D2 is allocated. Usually, in a sequence SE, the last cycle CY1, CY2, CY3 to which a maximum duty cycle D2 is allocated has the highest average value of the current IL in the inductor L. This is due to the fact that cycles CY1, CY2, CY3 with the minimum duty cycle D1 occur at the end of the sequence SE. This highest amount of energy should be supplied to an output O1, O2, O3 which is going to receive a much smaller amount of energy than required. This is particularly true for an output O1, O2, O3 which has already a voltage V1, V2, V3 below its reference value VR1, VR2, VR3 and to which a maximum duty cycle D2 has to be allocated because there are no minimum duty cycles D1 left.

The allocator 141 may, if in a preceding sequence SE, the minimum duty cycle D1 is allocated to a particular one of the output voltages V1, V2, V3 while the associated reference voltage VR1, VR2, VR3 is lower, allocate in a next sequence SE the maximum duty cycle D2 to this particular one of the output voltages V1, V2, V3. Or, similarly, the allocator 114 may, if in a preceding sequence SE the maximum duty cycle D2 is allocated to a particular one of the output voltages V1, V2, V3 while the associated reference voltage VR1, VR2, VR3 is higher, allocate in a next sequence SE the minimum duty cycle D1 to this particular one of the output voltages V1, V2, V3. Thus, if in a particular sequence SE, either the minimum D1 or the maximum D2 duty cycle has to be allocated to an output O1, O2, O3 of which the voltage V1, V2, V3 is above or below its reference level VR1, VR2, VR3, respectively, in a next sequence SE the correct duty cycle is allocated to this output O1, O2, O3. This has the advantage, that the wrong allocation of duty cycles will be averaged over time and thus its negative influence on the regulation of the output voltages V1, V2, V3 concerned is minimized.

In a further embodiment in accordance with the invention, the DC-DC converter further comprises mode detectors 15 which keep track of the modes of the outputs O1, O2, O3. The mode detectors, combined in the block indicated by 15, determine the new mode of each of the outputs O1, O2, O3 based on the output signals of the comparators 10, 11, 12 and the previous mode of the outputs O1, O2, O3, as is elucidated with respect to FIG. 6, to supply a control signal to a sequence controller 142 of the cycle generator 14. The sequence controller 142 controls a number of cycles CY required in a sequence SE such that cycles CY are generated only for outputs O1, O2, O3 which are in a state indicating that current has to be supplied to the associated loads L1, L2, L3 and not for outputs O1, O2, O3 which are in a state indicating that no current has to be supplied to the associated loads L1, L2, L3.

FIG. 4 show signals for elucidating the operation of the DC-DC converter of FIG. 3. FIGS. 4A, 4B, 4C show the first, second and third output voltages V1, V2, V3 and their associated reference levels VR1, VR2 and VR3, respectively. FIG. 4D shows the current IL in the inductor L.

At the instant t15, as indicated by the arrows SV1, SV2, SV3 the comparators 12, 11, 10 compare the output voltages V1, V2, V3 with the reference levels VR1, VR2, VR3, respectively. The output voltages V1 and V2 both have a value below their associated reference levels VR1 and VR2. The output voltage V3 has a value above its associated reference level VR3. Consequently, in the next sequence SE from instant t15 to instant t21, two of the cycles CY1, CY2, CY3 will have the maximum duty cycle D2, and one of the cycles CY1, CY2, CY3 will have the minimum duty cycle D1.

The allocation of the one minimum duty cycle D1 and the two maximum duty cycles D2 in the sequence SE may be performed in several ways. Preferably, first, it is tried to allocate minimum duty cycles D1 to cycles CY1, CY2, CY3 in which the output voltage V1, V2, V3 is below the associated reference voltage VR1, VR2, VR3, and to allocate maximum duty cycles D2 to cycles CY1, CY2, CY3 in which the output voltage V1, V2, V3 is above the associated reference voltage VR1, VR2, VR3. Therefore, if available, a maximum duty cycle D2 has to be allocated to the third switch S3 because the third output voltage V3 is higher than its reference level VR3, and a minimum duty cycle D1 has to be allocated to the first and second switch S1 and S2.

However, in the embodiment in accordance with the invention as shown in FIG. 4D, to either the first V1 or the second V2 output voltage a maximum duty cycle D2 has to be allocated as there is only a single minimum duty cycle D1 to be allocated. Thus in the process of allocating the single minimum duty cycle D1 and the two maximum duty cycles D2 to the three available cycles CY1, CY2, CY3 in the sequence SE it has been decided to allocate one of the maximum duty cycles D2 to the third switch S3 (the third output voltage V3 has a value above its reference VR1). The other maximum duty cycle D2 and the single minimum duty cycle D1 are allocated to the switches S1 and S2. For one of the switches S1, S2 this is correct because a minimum duty cycle D1 should be allocated to output voltages V1 and V2 which have a value below their reference values VR1 and VR2. For the other one of the switches S1, S2 this is incorrect.

It is advantageous to select the allocation in time of the duty cycles in the order: first the two maximum duty cycles D2 and then the minimum duty cycle D1. In this manner, first the average current IL through the inductor L increases preventing the current IL from crossing zero during the cycle in which the minimum duty cycle D1 occurs.

In a next step, it has to be selected in what order the power has to be delivered to the outputs O1, O2, O3. It is clear that the switch S3 should be operated with the maximum duty cycle D2, and thus should be associated with the first or the second cycle CY1 or CY2. As the third output voltage V3 has already a value above its reference value VR3 it is advantageous to supply as little as possible power to the third output O3. Consequently, this third switch S3 should be associated with the first cycle CY1 because the average current IL in the inductor L is minimal. The association of the first and the second switch S1, S2 to the second and third cycle S2, S3 is not important, one of the switches S2, S3 will be controlled correctly, the other will not. Preferably, if possible, in a next sequence SE, the allocation to the switches S2 and S3 is reversed to obtain an averaging effect.

In that which follows some embodiments in accordance with the invention are elucidated in more detail. Discussed are: first a dual output DC-DC up-converter, secondly a triple output up-converter, thirdly dual output down-converter.

The dual output up-converter is described with reference to FIG. 3 from the third output O3 and the associated components S3, C3, L3 and 10 are omitted. For the dual output up-converter, with two outputs O1 and O2, there are four output load options:

both outputs O1 and O2 require a load current to flow into the loads L1 and L2 to keep the output voltages V1 and V2 high enough, one output O1 requires a load current to flow in its associated load L1, the other output O2 requires a load current, both outputs O1 and O2 do not require a load current flowing into the loads L1 and L2 to prevent the output voltages V1 and V2 from rising too high.

When no output load current is required at both outputs O1 and O2, the output voltages V1 and V2 of both outputs O1 and O2 will be above their associated reference values VR1 and VR2 and no next cycles CY are required as is shown in the next table.

| V1 | V2 | L1 | L2 | Next cycles |
|----|----|----|----|-------------|
| >VR1 | >VR2 | off | off | — |

As soon as one of the output voltages V1 or V2 drops below its associated reference level VR1, VR2, the controller CO should switch to the situation with one output requiring a load current. With a maximum of one output O1, O2 with load current, the principle works the same as with single output control as is disclosed in WO 02/058220-A1. This means that if the output voltage V1, V2 is below its reference value VR1, VR2, the next switch cycle CY should have the maximum duty cycle, and when the output voltage V1, V2 is above its reference value VR1, VR2, the next switch cycle CY should be the minimum duty cycle D1. Thus, only the output O1, O2 with load current will get switching cycles CY and output power. The other output O1, O2 stays at a level above its reference level VR1, VR2 and gets no switching cycles CY as is shown in the following table, wherein the i in Di,j refers to the minimum duty cycle if i=1 and to the maximum duty cycle if i=2, and wherein j refers to output O1 (voltage V1) if j=1 and to output O2 (voltage V2) if j=2.

| V1 | V2 | L1 | L2 | Next cycles |
|----|----|----|----|-------------|
| >VR1 | >VR2 | on | off | D1, 1 |
| <VR1 | >VR2 | on | off | D2, 1 |
| >VR1 | >VR2 | off | on | D1, 2 |
| >VR1 | <VR2 | off | on | D2, 2 |

As soon as the other output O1, O2 drops below its reference voltage VR1, VR2, the controller CO should switch to the two-output situation. When the load L1, L2 at the active output O1, O2 is switched off and the output voltage V1, V2 gets and stays above its reference value VR1, VR2, the controller CO should switch back to the no-load situation at both outputs O1, O2.

For two outputs O1, O2 with load current, the inductor current IL has to be adapted correctly and the power has to be distributed according to the need at the outputs O1 and O2. With two outputs O1, O2 there are four options:

both outputs O1, O2 have an output voltage V1, V2 above their reference level VR1, VR2, the first output O1 has an output voltage V1 above its reference level VR1 and the second output O2 has an output voltage V2 below its reference level VR2, the first output O1 has an output voltage V1 below its reference level VR1 and the second output O2 has an output voltage V2 above its reference level VR2, both outputs O1, O2 have an output voltage V1, V2 below their reference level VR1, VR2.

The inductor current IL should increase when both output voltages V1 and V2 have values below their reference value VR1, VR2. The inductor current IL should decrease when both output voltages V1, V2 have values above their reference value VR1, VR2. And, the inductor current IL has to remain at the same level when one of the output voltages O1, O2 has a value above its associated reference level VR1, VR2, and one of the output voltages O1, O2 has a value below its associated reference level VR1, VR2. This results in a sequence SE of two maximum cycles D2 when the inductor current IL should increase, two minimum cycles D1 when the inductor current IL has to decrease, and one minimum D1 and one maximum D2 duty cycle when the inductor current IL must remain at the same level.

Thus, when both outputs O1, O2 have a voltage V1, V2 above their reference level VR1, VR2, they will both get a minimum duty cycle D1. In the same way when both outputs have a voltage below their reference level VR1, VR2, they both will get a second duty cycle D2. When one of the outputs O1, O2 is above its reference level VR1, VR2, and one O1, O2 below its reference level VR1, VR2, the situation is different. Since the maximum duty cycle D2 has a short second phase (during which the switch S1, S2 arranged between the inductor and the load L1, L2 is closed) the energy transfer to the output O1, O2 is smaller than during the minimum duty cycle D1 which has a longer second phase. This means that the output O1, O2 with an output voltage V1, V2 above its reference level VR1, VR2 will get a maximum duty cycle D2 and the output O1, O2 with an output voltage V1, V2 below its reference level VR1, VR2 will get a minimum duty cycle D1. To maximize the output power and prevent zero current in this situation first the maximum duty cycle D2 will occur and then a minimum duty cycle D1.

The next table shows these control rules for two active outputs. Again, the i in Di,j refers to the minimum duty cycle if i=1 and to the maximum duty cycle if i=2, and j refers to output O1 (voltage V1) if j=1 and to output O2 (voltage V2) if j=2. Each of the sequences comprises two successive next cycles.

| V1 | V2 | L1 | L2 | Next cycles |
|---|---|---|---|---|
| >VR1 | >VR2 | on | on | D1, 1; D1, 2 |
| >VR1 | <VR2 | on | on | D2, 1; D1, 2 |
| <VR1 | >VR2 | on | on | D2, 2; D1, 1 |
| <VR1 | <VR2 | on | on | D2, 1; D2, 2 |

When the load L1, L2 at one of the outputs O1, O2 is switched off and the output voltage V1, V2 gets and stays above its reference level VR1, VR2, the controller CO should switch back to the single output situation. When the load L1, L2 at both outputs O1, O2 is switched off and the output voltages V1, V2 get and stay above their reference levels VR1, VR2, the controller CO should switch back to the no-load situation.

If, as shown in FIG. 3, the up-converter has three outputs O1, O2, O3, there are eight output load options:

all outputs O1, O2, O3 have load current, two of the outputs O1, O2, O3 have load current, one of the outputs O1, O2, O3 has not (3 options)

one of the outputs O1, O2, O3 has load current, two of the outputs O1, O2, O3 have not (3 options)

all outputs O1, O2, O3 have no-load current.

With zero, one or two outputs O1, O2, O3 with load current the control is performed as described above for the two-output controllers. For three outputs O1, O2, O3, the outcome of the output voltage measurement has eight options:

all outputs O1, O2, O3 have a voltage V1, V2, V3 above their reference level VR1, VR2, VR3, two of the outputs O1, O2, O3 have a voltage V1, V2, V3 above their reference level VR1, VR2, VR3 and one below its reference level VR1, VR2, VR3 (3 options), one of the outputs O1, O2, O3 has a voltage V1, V2, V3 above its reference level VR1, VR2, VR3 and two below their reference level VR1, VR2, VR3 (3 options), all outputs O1, O2, O3 have a voltage V1, V2, V3 below their reference level VR1, VR2, VR3.

When all outputs O1, O2, O3 are below their reference level VR1, VR2, VR3, the inductor current IL should have a large increase, which results in three maximum duty cycles D2, one for each output.

When all outputs O1, O2, O3 are above their reference level VR1, VR2, VR3, the inductor current IL should have a large decrease, which results in three minimum duty cycles D1, one for each output. When two of the outputs O1, O2, O3 are above their reference level VR1, VR2, VR3 and one output below its reference level VR1, VR2, VR3, the inductor current IL should decrease, which results in one maximum duty cycle D2 and two minimum duty cycles D1, wherein the maximum duty cycle D2 is allocated to one of the outputs O1, O2, O3 above its reference level VR1, VR2, VR3, and the first one of the minimum duty cycles D1 is allocated to one of the outputs O1, O2, O3 below its reference level VR1, VR2, VR3 since this cycle has the highest energy transfer due to the higher inductor current IL.

When one of the outputs O1, O2, O3 is above its reference level VR1, VR2, VR3 and two of the outputs O1, O2, O3 are below their reference level VR1, VR2, VR3, the inductor current IL should increase, which results in two maximum duty cycles D2 and one minimum duty cycle D1, wherein the minimum duty cycle D1 is allocated to one of the outputs O1, O2, O3 below their reference level VR1, VR2, VR3, and the second maximum duty cycle D2 is allocated to the other one of the outputs O1, O2, O3 with a value below its reference level VR1, VR2, VR3 since this cycle has the highest energy transfer due to the higher inductor current (IL). The control rules for three active outputs are shown in the table below. The i in Di,j refers to the minimum duty cycle if i=1 and to the maximum duty cycle if i=2, and wherein j refers to output O1 (voltage V1) if j=1, to output O2 (voltage V2) if j=2, and to output O3 (voltage V3) if j=3. Each of the sequences comprises three successive next cycles.

| V1 | V2 | V3 | L1 | L2 | L3 | Next cycles |
|---|---|---|---|---|---|---|
| >VR1 | >VR2 | >VR3 | on | on | on | D1, 1; D1, 2; D1, 3 |
| <VR1 | >VR2 | >VR3 | on | on | on | D2, 2; D1, 1; D1, 3 |
| >VR1 | <VR2 | >VR3 | on | on | on | D2, 3; D1, 2; D1, 1 |
| >VR1 | >VR2 | <VR3 | on | on | on | D2, 1; D1, 3; D1, 2 |
| >VR1 | <VR2 | <VR3 | on | on | on | D2, 1; D2, 2; D1, 3 |
| <VR1 | >VR2 | <VR3 | on | on | on | D2, 2; D2, 3; D1, 1 |
| <VR1 | <VR2 | >VR3 | on | on | on | D2, 3; D2, 1; D1, 2 |
| <VR1 | <VR2 | <VR3 | on | on | on | D2, 1; D2, 2; D2, 3 |

When the load L1, L2, L3 at one or two of the outputs O1, O2, O3 is switched off and the output voltage V1, V2, V3 gets and stays above its reference value VR1, VR2, VR3, the controller CO should switch back to the dual or single output situation. When the load L1, L2, L3 at all outputs O1, O2, O3 is switched off and the output voltages V1, V2, V3 get and stay above their reference values VR1, VR2, VR3 the controller CO should switch back to the no-load situation.

For a down-converter, the situation is different. In down-conversion the inductor current IL flows to the output O1, O2, O3 during the complete switch cycle CY and not only during the second phase. This means that energy is transferred during the complete switch cycle CY, which results in no significant difference in energy transfer between a minimum D1 and a maximum D2 duty cycle. Similar to up-conversion the different options for two outputs O1 and O2 will be elucidated below.

With no output load current at both outputs O1, O2, the output voltage V1, V2 of both outputs O1, O2 will be above their reference level VR1, VR2 as is shown in the next table and no cycles will be required.

| V1 | V2 | L1 | L2 | Next cycles |
|---|---|---|---|---|
| >VR1 | >VR2 | off | Off | — |

With at maximum one of the outputs O1, O2 with load current, the principle works identical by with single output control described earlier. This means that if the output voltage V1, V2 is below its reference level VR1, VR2, the next switch cycle CY should have a maximum duty cycle D2, and when the output voltage V1, V2 is above its reference level VR1, VR2, the next switch cycle CY should have a minimum duty cycle D1. Only the output O1, O2 with load current will get a switching cycle CY and output power. The other output O1, O2 stays at a level above its reference level VR1, VR2 and gets no switching cycles CY. The next table lists the control rules for one active output.

| V1 | V2 | L1 | L2 | Next cycles |
|---|---|---|---|---|
| >VR1 | >VR2 | on | off | D1, 1 |
| <VR1 | >VR2 | on | off | D2, 1 |
| >VR1 | >VR2 | off | on | D1, 2 |
| >VR1 | <VR2 | off | on | D2, 2 |

For two outputs O1, O2 with load current the inductor current IL has to be adapted correctly and the power has to be distributed according to the need at the output O1, O2. The main difference with up-conversion is that energy is transferred during the complete switching cycle CY. Consequently, the amount of energy transferred does not depend on the duty cycle, thus, the choice of the minimum D1 and the maximum D2 duty cycle is less critical. The table below shows the control rules for two active outputs, always two cycles CY occur during a sequence SE.

| V1 | V2 | L1 | L2 | Next cycles |
|---|---|---|---|---|
| >VR1 | >VR2 | on | on | D1, 1 D1, 2 |
| >VR1 | <VR2 | on | on | D2, 2 D1, 1 or D2, 1 D1, 2 |
| <VR1 | >VR2 | on | on | D2, 1 D1, 1 or D2, 2 D1, 1 |
| <VR1 | <VR2 | on | on | D2, 1 D2, 2 |

The conclusion for down-conversion is that at least the same rules are valid as for up-conversion. There are additional alternatives since the choice from the minimum D1 and the maximum D2 duty cycles is no longer critical for the outputs O1, O2 but is only relevant for the inductor current IL.

FIG. 5 shows a block diagram of an apparatus with a DC-DC converter in accordance with the invention. The DC-DC converter in accordance with the invention, which is denoted by 100, receives an input voltage Vin and supplies a first output voltage V1 to a first circuit 101, a second output voltage V2 to a second circuit 102, and a third output voltage V3 to a third circuit 103. The first, second and third circuits 101, 102, 103 may be internal circuits (for example a receiver, a transmitter and a display in a mobile phone, or signal processing circuits and a display in a television or computer display) in an audio-visual application or may be external apparatuses.

FIG. 6 shows a state diagram for elucidating the modes of output voltages. For the control of the converter, it is not required to measure whether an output Oi requires a load current or not. The mode of an output Oi is tracked with an algorithm elucidated with respect to the state diagram. The index i is an integer which indicates one of a plurality of outputs, depending on how many output Oi the converter has.

The modes are defined as follows:

mode 0: the output voltage Vi is larger than its reference voltage VRi, no power required, the output Oi is not active, mode 1: the output voltage Vi is larger than its reference voltage VRi, minimum power required, the output Oi is active, mode 2: the output voltage Vi is smaller than its reference voltage VRi, maximum power required, the output Oi is active, The value of the mode is determined by the previous mode and the new sampled output voltage Vi. If the sampled output voltage Vi is smaller than its reference value VRi, always mode 2 will be reached. If the sampled output voltage Vi is larger than its reference value VRi, mode 2 changes into mode 1, and mode 1 changes into mode 0. If the output voltage Vi is larger than its reference value VRi, the mode 1 will become mode 0 and mode 0 will stay mode 0 and the output Oi is not active. Thus, in active operation, for each output Oi, the mode will alternate between mode 1 and mode 2 in a sequence that depends on the measured value of the output voltage Vi. If one of the outputs Oi has zero load current its output voltage Vi will remain above its reference level VRi which results in mode 0.

FIG. 7 shows a flow chart of a control algorithm in a DC-DC converter in accordance with the invention. The flow chart elucidates the operation of a dual output up-converter.

In step 100 the values of the output voltages V1 and V2 are measured.

In step 101 there is checked whether both the value of the output voltage V1 is smaller than its reference value VR1 and the value of the output voltage V2 is smaller than its reference value VR2. If they are, in step 102, both the mode of output O1 (at which the voltage V1 is present) and output O2 (at which the voltage V2 is present) will change into mode 2, if the mode was 2 it will stay 2. And in step 103, in a sequence SE of cycles CY, the first maximum duty cycle D2 is applied to the first switch S1 associated with the first output voltage V1, and then the second maximum duty cycle D2 is applied to the second switch S2 associated with the second output voltage V2, or the other way around.

If they are not, in step 104 there will be checked whether both the value of the output voltage V1 is larger than its reference value VR1 and the value of the output voltage V2 is smaller than its reference value VR2. If they are, in step 105 there will be checked whether the mode of output O1 is lower than mode 2. If it is, in step 106, the mode of output 1 will be changed into mode 0, and the mode of output 2 will become mode 2, and only a maximum duty cycle D2 will be applied to the switch S2. No switching cycle will be allocated to the switch S1. If the mode of output O1 is not lower than 2, in step 108, the mode of output O1 will become 1, and the mode of output 2 will be 2, and first a maximum duty cycle D2 will be applied to the first switch S1, and then a minimum duty cycle D1 will be applied to the second switch S2.

If the outcome of step 104 is no, In step 110 there will be checked whether the value of the output voltage V1 is smaller than its reference value VR1 and whether the value of the output voltage V2 is larger than its reference value VR2. If they are, in step 111 there will be checked whether the mode of the output O2 is smaller than 2, if it is, in step 112, the mode of output O1 will be changed into mode 2, and the mode of output O2 will be mode 0, and only a maximum duty cycle D2 will be applied to the switch S1. No switching cycle will be allocated to the switch S2. If the mode of the output O2 is not lower than 2, in step 114, the mode of output O1 will be mode 2 and the mode of output O2 will be mode 1, and first a maximum duty cycle D2 will be applied to the second switch S2 and then a minimum duty cycle will be applied to the first switch S1.

If step 116 is reached, the value of the output voltage V1 will be larger than its reference value VR1 and the value of the output voltage V2 will be larger than its reference value VR2. In step 117 is detected whether both the mode of the first output O1 and of the second output O2 is lower than mode 2. If it is, in step 119, the mode of outputs O1 and O2 will become mode 0, and in step 119 a wait cycle will be started until at least one of the output voltages V1, V2 drops below its reference value VR1, VR2. If not then step 120 will be performed.

In step 120 there is checked whether the output O1 has a mode smaller than mode 2, if it has, in step 121, the mode of output O1 will be made mode 0, and the mode of output O2 will be made mode 1, and in step 122 the sequence SE will contain a single minimal duty cycle D1 applied to the switch S2. If it has not then step 123 will be performed.

In step 123 is checked whether the output O2 has a mode smaller than mode 2, if it has, in step 124, the mode of output O1 will be made mode 1, and the mode of output O2 will be made mode 0, and in step 125 the sequence SE will contain a single minimal duty cycle D1 applied to the switch S1. If the output O2 has a mode 2, in step 126 the mode of outputs O1 and O2 will become 1, and in step 127, the sequence SE will comprise a minimal duty cycle D1 applied to the first switch S1 and a minimum duty cycle D1 applied to the second switch S2.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. The word "comprising" does not exclude the presence of elements or steps other than those listed in a claim. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A multi-output DC-DC converter comprising:
   an inductor,
   a main switch for periodically coupling a DC-input voltage to the inductor,
   a plurality of output switches coupled to the inductor, each one for generating an associated one of a plurality of output voltages to an associated one of a plurality of loads, and
   a controller for controlling the main switch and the output switches in a sequence of cycles, each one of the cycles comprising an on-phase of the main switch followed by an on-phase of one of the plurality of the output switches the controller comprising:
   a plurality of comparators each one for comparing an associated one of the plurality of output voltages with an associated one of a plurality of reference voltages,
   means for determining whether a number of the output voltages which have a value above their associated reference voltage is larger than, smaller than, or equal to a number of the plurality of output voltages which have a value below their associated reference voltage,
   means for generating the cycles either with a first duty cycle or a second duty cycle being larger than the first duty cycle to obtain a first number of cycles with the first duty cycle and a second number of cycles with the second duty cycle, the first number being: (1) larger than the second number if the number of the output voltages which have a value above, their associated reference voltage is larger than the number of the plurality of output voltages which have a value below their associated reference voltage; (2) smaller than the second number if the number of the output voltages which have a value above their associated reference voltage is smaller than the number of the plurality of output voltages which have a value below their associated reference voltage; or (3) equal to the second number the second number if the number of the output voltages which have a value above their associated reference voltage is equal to the number of the plurality of output voltages which have a value below their associated reference voltage.

2. A multi-output DC-DC converter as claimed in claim 1, wherein the first number is equal to the number of output voltages which have a value above their associated reference voltage, and wherein the second number is equal to the number of output voltages which have a value below their associated reference voltage.

3. A multi-output DC-DC converter as claimed in claim 2, wherein the means for generating the cycles comprises a sequencer for controlling an order of the cycles in a sequence wherein, as much as possible at the present values of the first number and the second number, one of the cycles with the second duty cycle precedes one of the cycles with the first duty cycle.

4. A multi-output DC-DC converter as claimed in claim 2, wherein the means for generating the cycles comprises a sequencer for controlling an order of the cycles in a sequence to first comprise all the cycles the second duty cycle and then all the cycles with the first duty cycle.

5. A multi-output DC-DC converter as claimed in claim 2, wherein the means for generating the cycles comprises a means for allocating: the first number of the first duty cycles as much as possible to cycles associated with output voltages that have a value below their corresponding reference voltage, and the second number of the second duty cycles as much as possible to cycles associated with output voltages which have a value above their corresponding reference voltage.

6. A multi-output DC-DC converter as claimed in claim 5, wherein the means for allocating the number of duty cycles is adapted for further allocating the first duty cycle to cycles associated with output voltages that have a value above their corresponding reference voltage if the first number is larger than the number of output voltages that have a value below their associated reference voltage.

7. A multi-output DC-DC convener as claimed in claim 5, wherein the means for allocating is adapted for further allocating the second duty cycle to cycles associated with output voltages that have a value below their associated reference voltage if the second number is larger than the number of output voltages that have a value above their associated reference voltage.

8. A multi-output DC-DC converter as claimed in claim 5, wherein the means for allocating is adapted for allocating to a predetermined one of the cycles in a sequence wherein a lowest amount of energy is transferred to one of the output voltages of which the value is above the associated reference voltage.

9. A multi-output DC-DC converter as claimed in claim 5, wherein the means for allocating is adapted for allocating as a first one of the cycle in a sequence an output voltage of which the value is above the associated reference voltage and to which a first duty cycle is allocated.

10. A multi-output DC-DC convener as claimed in claim 5, wherein the means for allocating is adapted for allocating to a predetermined one of the cycles in a sequence wherein a highest amount of energy is transferred to one of the output voltages of which the value is below the associated reference voltage.

11. A multi-output DC-DC converter as claimed in claim 5, wherein the means for allocating is adapted for allocating, in a sequence, a last cycle to which a second duty cycle is allocated to an output voltage of which the value is below the associated reference voltage and to which a second duty cycle is allocated.

12. A multi-output DC-DC converter as claimed in claim 5, wherein the means for allocating is adapted to allocate in a next sequence the second duty cycle to a particular one of the output voltages, if in a preceding sequence the first duty cycle is allocated to this particular one of the output voltages while the associated reference voltage is lower.

13. A multi-output DC-DC converter as claimed in claim 5, wherein the means for allocating is adapted to allocate in a next sequence the first duty cycle to a particular one of the output voltages, if in a preceding sequence the second duty cycle is allocated to this particular one of the output voltages while the associated reference voltage is higher.

14. A multi-output DC-DC convener as claimed in 1, the multi-output DC-DC converter further comprising mode detectors, each one being associated with one of the multiple output voltages for keeping track of a mode of each one of a multiple outputs, each mode detector having three states, a first state indicating whether no load current is drawn from the associated output, a second state and a third state wherein load current is drawn from the associated output, if the associated output is in the first state and the associated output voltage is smaller than its associated reference voltage the third state is entered, if the associated output is in the first state and the associated output voltage is larger than its associated reference voltage the first state will be maintained, if the associated output is in the second state and the associated output voltage is larger than its associated reference voltage the first state is entered, if the associated output is in the second state and the associated output voltage is smaller than its associated reference voltage the third state is entered, if the associated output is in the third state and the associated output voltage is smaller than its associated reference voltage the third state is maintained, if the associated output is in the third state and the associated output voltage is larger than its associated reference voltage the second state is entered.

15. A multi-output DC-DC converter as claimed in 14, the means for generating the cycles further comprising a sequence controller for controlling a number of cycles required in a sequence such that cycles are generated only for outputs that are in the second state or the third state.

16. A method of controlling a multi-output DC-DC converter comprising: an inductor, a main switch for periodically coupling a DC-input voltage to the inductor, a plurality of output switches coupled to the inductor, each one for supplying an associated one of a plurality of output voltages to an associated one of a plurality of loads, the method comprising: controlling the main switch and the output switches in a sequence of cycles, each one of the cycles containing an on-phase of the main switch followed by an on-phase of one of the plurality of the output switches, the method of controlling comprising:
  comparing a corresponding one of the plurality of output voltages with an associated one of a plurality of reference voltages,
  determining whether a number of the output voltages that have a value above their associated reference voltage, is larger than, smaller than, or equal to a number of the plurality of output voltages that have a value below their associated reference voltage, and
  generating the cycles either only with a first duty cycle or a second duty cycle being larger than the first duty cycle to obtain a first number of cycles with the first duty cycle and a second number of cycles with the second duty cycle, the first number being: (1) larger than the second number if the number of the output voltages which have a value above their associated reference voltage is larger than the number of the plurality of output voltages which have a value below their associated reference voltage; (2) smaller than the second number if the number of the output voltages which have a value above their associated reference voltage is smaller than the number of the plurality of output voltages which have a value below their associated reference voltage; or (3) equal to the second number the second number if the number of the output voltages which have a value above their associated reference voltage is equal to the number of the plurality of output voltages which have a value below their associated reference voltage.

* * * * *